US009483651B2

(12) United States Patent
Claessen et al.

(10) Patent No.: US 9,483,651 B2
(45) Date of Patent: Nov. 1, 2016

(54) METHODS AND APPARATUS FOR TRANSFER OF CONTENT TO A SELF CONTAINED WIRELESS MEDIA DEVICE

(75) Inventors: Albertus Maria Gerardus Claessen, Oakwood, GA (US); Nathaniel Christopher Herwig, Lawrenceville, GA (US); James Henderson, Fife (GB)

(73) Assignee: NCR CORPORATION, Duluth, GA (US)

( * ) Notice: Subject to any disclaimer, the term of this patent is extended or adjusted under 35 U.S.C. 154(b) by 439 days.

(21) Appl. No.: 12/627,281

(22) Filed: Nov. 30, 2009

(65) Prior Publication Data

US 2011/0131660 A1    Jun. 2, 2011

(51) Int. Cl.
| G06F 21/60 | (2013.01) |
| H04W 12/02 | (2009.01) |
| H04W 12/10 | (2009.01) |
| H04W 12/06 | (2009.01) |
| H04W 12/08 | (2009.01) |
| H04L 29/06 | (2006.01) |
| G06F 21/00 | (2013.01) |
| G06F 13/38 | (2006.01) |

(Continued)

(52) U.S. Cl.
CPC .......... *G06F 21/606* (2013.01); *G06F 13/385* (2013.01); *G06F 21/00* (2013.01); *H04L 63/0428* (2013.01); *H04N 21/2223* (2013.01); *H04N 21/4184* (2013.01); *H04N 21/41407* (2013.01); *H04N 21/472* (2013.01); *H04N 21/6131* (2013.01); *H04W 12/02* (2013.01); *H04W 12/06* (2013.01); *H04W 12/08* (2013.01); *H04W 12/10* (2013.01); *G06F 2213/3804* (2013.01); *G06F 2213/3814* (2013.01)

(58) Field of Classification Search
CPC ... H04W 12/02; H04W 12/08; H04W 12/06; H04W 12/10; H04W 8/02; H04W 64/003; G06F 13/385; G06F 21/00; G06F 21/606; H04L 63/0428

USPC ............................ 705/64–67, 75–77; 726/26
See application file for complete search history.

(56) References Cited

U.S. PATENT DOCUMENTS 7,130,585 B1 * 10/2006 Ollis et al. ................... 455/41.2
7,464,213 B2 * 12/2008 Fukuda ......................... 710/301

(Continued)

OTHER PUBLICATIONS

Sinitsyn, Alexander. "A synchronization framework for personal mobile servers." Pervasive Computing and Communications Workshops, 2004. Proceedings of the Second IEEE Annual Conference on. IEEE, 2004. (pp. 208-212).*

(Continued)

*Primary Examiner* — Kari Schmidt
(74) *Attorney, Agent, or Firm* — Schwegman, Lundberg & Woessner

(57) ABSTRACT

Systems and techniques for transferring data to a storage device. A storage device includes storage, a processor, and a wireless transceiver, as well as a connector allowing the storage device to operate according to an appropriate standard when connected to a playback or data device. The storage device can communicate with a data transfer station to wirelessly receive data from the station. A user may select data to be transferred to a removable media device, and the station transfers the data over a wireless connection. The removable media device stores the data in memory as it is received. Once the data has been received, the data can be played or otherwise used in any playback or data device to which the storage device may be connected for use as a memory device.

19 Claims, 2 Drawing Sheets

(51) Int. Cl.
*H04N 21/222* (2011.01)
*H04N 21/414* (2011.01)
*H04N 21/418* (2011.01)
*H04N 21/472* (2011.01)
*H04N 21/61* (2011.01)

(56) References Cited

U.S. PATENT DOCUMENTS

| | | | | |
|---|---|---|---|---|
| 7,705,732 | B2* | 4/2010 | Bishop et al. | 340/572.1 |
| 7,706,680 | B2* | 4/2010 | Okamoto | 396/321 |
| 7,929,488 | B2* | 4/2011 | Fujita | 370/328 |
| 8,001,054 | B1* | 8/2011 | Peart et al. | 705/75 |
| 8,098,598 | B1* | 1/2012 | Contino et al. | 370/259 |
| 8,260,722 | B2* | 9/2012 | Peart et al. | 705/75 |
| 2002/0065074 | A1* | 5/2002 | Cohn | H04M 3/487 455/456.3 |
| 2002/0174337 | A1* | 11/2002 | Aihara | 713/172 |
| 2003/0074328 | A1* | 4/2003 | Schiff et al. | 705/75 |
| 2003/0109218 | A1* | 6/2003 | Pourkeramati et al. | 455/3.05 |
| 2003/0163716 | A1* | 8/2003 | Robins et al. | 713/193 |
| 2004/0141617 | A1* | 7/2004 | Volpano | 380/270 |
| 2004/0192380 | A1* | 9/2004 | Chen | 455/556.1 |
| 2004/0254940 | A1* | 12/2004 | Brush | 707/100 |
| 2005/0060233 | A1* | 3/2005 | Bonalle et al. | 705/16 |
| 2005/0091164 | A1* | 4/2005 | Varble | 705/52 |
| 2005/0223277 | A1* | 10/2005 | Ballard | 714/15 |
| 2005/0224589 | A1* | 10/2005 | Park et al. | 235/492 |
| 2005/0250555 | A1* | 11/2005 | Richardson et al. | 455/572 |
| 2006/0010270 | A1* | 1/2006 | Zhang | 710/74 |
| 2006/0135190 | A1* | 6/2006 | Drouet et al. | 455/514 |
| 2006/0218598 | A1* | 9/2006 | Casey et al. | 725/86 |
| 2007/0073937 | A1* | 3/2007 | Feinberg et al. | 710/62 |
| 2007/0107020 | A1* | 5/2007 | Tavares | 725/81 |
| 2007/0138305 | A1* | 6/2007 | Ito | 235/492 |
| 2007/0233601 | A1* | 10/2007 | Nakada et al. | 705/51 |
| 2008/0021959 | A1* | 1/2008 | Naghi et al. | 709/204 |
| 2008/0076470 | A1* | 3/2008 | Ueda et al. | 455/556.1 |
| 2008/0168525 | A1* | 7/2008 | Heller et al. | 725/139 |
| 2008/0183959 | A1* | 7/2008 | Pelley et al. | 711/109 |
| 2008/0198821 | A1* | 8/2008 | Volpano | 370/338 |
| 2009/0049464 | A1* | 2/2009 | Kang | 725/1 |
| 2009/0117846 | A1* | 5/2009 | Mavrakakis | 455/3.06 |
| 2009/0232305 | A1* | 9/2009 | Alessi et al. | 380/239 |
| 2010/0007768 | A1* | 1/2010 | Yong et al. | 348/231.9 |
| 2010/0057563 | A1* | 3/2010 | Rauber et al. | 705/14.53 |
| 2010/0277120 | A1* | 11/2010 | Cook et al. | 320/108 |
| 2011/0015985 | A1* | 1/2011 | Curtis | 705/14.37 |
| 2011/0131591 | A1* | 6/2011 | Henderson | 720/600 |
| 2011/0154499 | A1* | 6/2011 | Rohan et al. | 726/26 |

OTHER PUBLICATIONS

Kara, Hayat, and Christopher Edwards. "A caching architecture for content delivery to mobile devices." Euromicro Conference, 2003. Proceedings. 29th. IEEE, 2003. (pp. 241-248).*

Ravi, Srivaths, Anand Raghunathan, and Nachiketh Potlapally. "Securing wireless data: system architecture challenges." Proceedings of the 15th international symposium on System Synthesis. ACM, 2002. (pp. 195-200).*

* cited by examiner

METHODS AND APPARATUS FOR TRANSFER OF CONTENT TO A SELF CONTAINED WIRELESS MEDIA DEVICE

FIELD OF THE INVENTION

The present invention relates generally to improved systems and techniques for dispensing of content, such as video and music. More particularly, the invention relates to improved systems and techniques for delivery of content to a self contained wireless media device.

BACKGROUND OF THE INVENTION

Modern consumers of entertainment possess numerous devices capable of playing entertainment content, and content may be delivered to these devices in any number of ways. One particularly useful and versatile medium for storing content is a removable memory device, such as a SECURE DIGITAL™ (SD™) card. Such devices are increasingly becoming available with capacities sufficient to store the large file sizes associated with video content.

As entertainment content increasingly becomes detached from any particular storage medium, delivery to users may take many forms, and self service storage and delivery of content may be accomplished in very little physical space, allowing for self service distribution points to be placed in any number of locations where a user may be. The ability of a user to possess and carry large capacity storage devices invites delivery of content to such devices using self service channels. However, the transfer of a large file may require a significant amount of time, so that it becomes inconvenient for a user to wait near a self service distribution point, such as a kiosk or self service terminal, while a large file or collection of files is transferred to a user device.

SUMMARY OF THE INVENTION

In its several aspects, the present invention provides for wireless transfer of entertainment and other content that is to be delivered to a user by providing for a self contained removable media device capable of relatively autonomous wireless communication with a content distribution point. A wireless storage device includes a wireless communication interface and stores wireless communication software for controlling the interface and conducting wireless communications, such as over a wireless network. The interface and the wireless communication software are capable of supporting any of a number of standard encryption systems, and the device may also store an encryption key used for remote communication with a self service system employing the same encryption key or a compatible encryption key. The self service system may store its own copy of the key, or such a key, or may be read from the wireless storage device or entered by a user when transfer of content is desired. The wireless storage device may take many forms, such as a portable hard disc drive, a solid state drive such as a universal serial bus (USB) drive, or a media player adapted to provide wireless communication capabilities.

One particularly convenient mechanism for implantation of the present invention is a removable media device, such as a COMPACT FLASH® card, a SECURE DIGITAL™ card, a MEMORY STICK™, or any other removable media device. Removable media devices are widely used and employ standard interfaces that are employed by many different devices, such as media players and wireless communication devices, and are small and have low power requirements. If a removable media device is used, it may be inserted in, and receive power from, any compatible device of the user, such as a camera, computer, portable player, telephone, or specialized adapter dedicated to powering the media device during data transfer, and may carry on communications independently of the supporting device in which it is inserted, only depending on the supporting device to provide power. Other mechanisms for delivering power may include an onboard battery of the device, a power adapter, particularly in the case of relatively high power consumption devices such as portable hard disc drives, or powering through a USB port of a support device.

Digital rights management (DRM) information may also be associated with the wireless storage device and used to protect content that is to be transferred to the removable media device, so that the content may not be used except under conditions acceptable to the provider. For example, the DRM information may prevent the copying of content, may limit the time period during which the content may be played, and may impose other appropriate restrictions on use or transfer of content.

Alternatively or in addition, a wireless storage device, particularly a low power consumption device such as a removable media device, may provide for higher speed shorter range data transfer, and may include a high speed transceiver for communication with a suitably equipped distribution point. Such a distribution point may be equipped to transfer content to a wireless storage device over a relatively long range wireless network operating in a facility, and may also be equipped to wirelessly transfer content either over the network or at higher speed and shorter range while powering the wireless storage device, such as a removable media device, through induction if the removable media device is placed appropriately at the distribution station.

Once content has been transferred to the device, the user may read the content from the device as desired. For example, information stored on a removable media device may be transferred to a suitable playback or storage device, or may be played directly from the media device by placing the media device in a desired playback device. A solid state drive may be placed in a USB port of a data processing or playback device, and a media player may simply play the content directly using its own capabilities.

A more complete understanding of the present invention, as well as further features and advantages of the invention, will be apparent from the following Detailed Description and the accompanying drawings.

DETAILED DESCRIPTION

Figure 1:
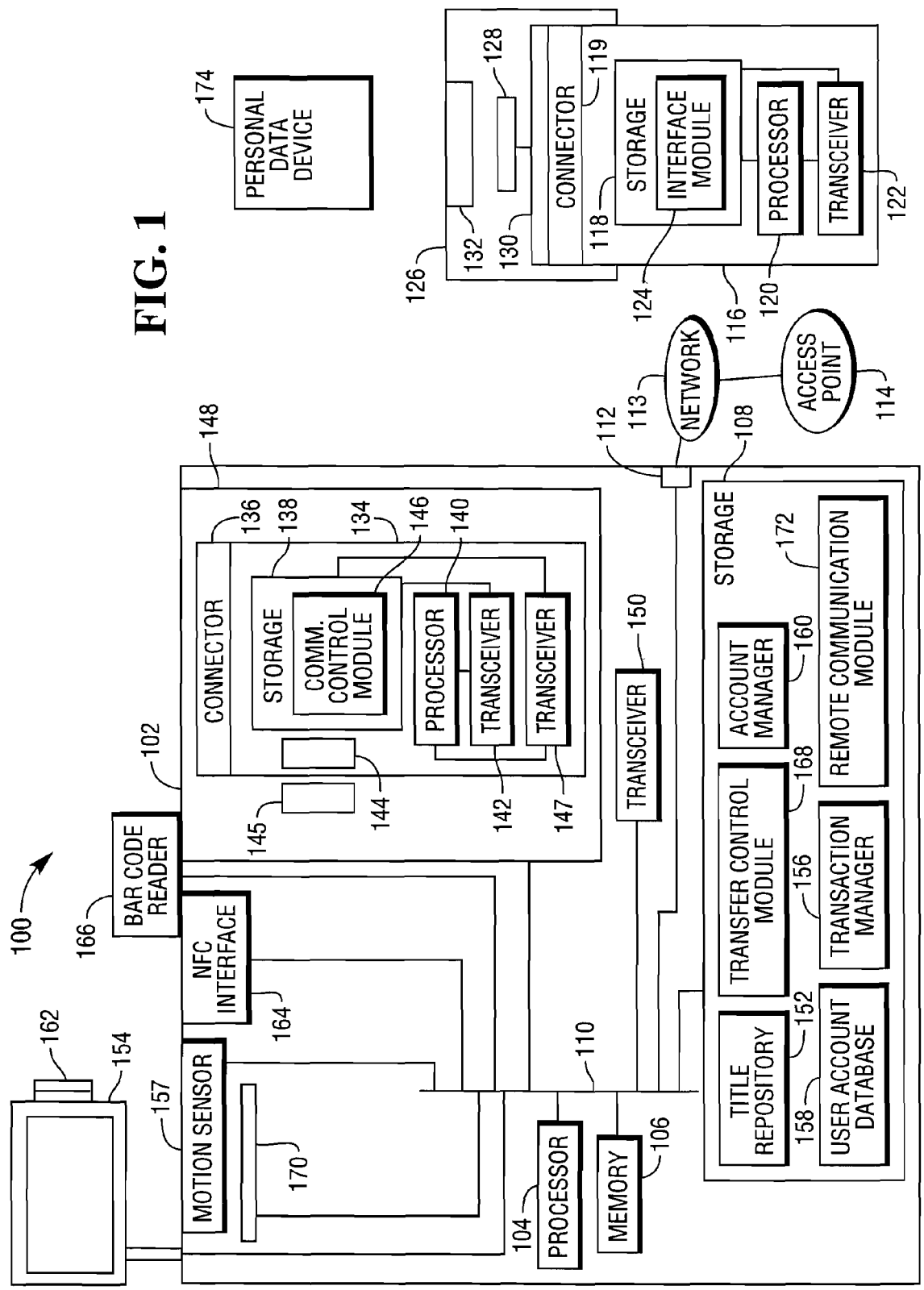
FIG. 1 illustrates a system for wireless data transfer according to an aspect of the present invention.

FIG. 1 illustrates a wireless data transfer system 100 according to an aspect of the present invention. The system includes a data transfer station 102, including a processor 104, memory 106, and storage 108, communicating over a bus 110. The data transfer station 102 includes a network interface 112, which allows for communication with a network 113, including a wireless network access point 114, allowing for communication between the station 102 and devices capable of wireless network communication. An example of such a device is a wireless removable media device 116. The wireless media device 116 may be used as a conventional media card for playing media stored on the device. For example, the wireless media device may conform to standards used for removable memory cards, such as SECURE DIGITAL™ cards. The wireless media devices also provide mechanisms for receiving data wirelessly transmitted to the device. The wireless media device 116 comprises storage 118 and a connector 119, as well as an onboard processor 120 and wireless network transceiver 122. The wireless media device operates under the control of a wireless interface module 124. The storage 118 and connector 119 may suitably conform to the SECURE DIGITAL™ standard so that when the wireless media device 116 is inserted in an appropriate device for reading or playback, that device may recognize the wireless media device 116 in the same way that a conventional SECURE DIGITAL™ card would be recognized.

The wireless media device 116 can communicate with the data transfer station 102 through an access point such as the access point 114 without requiring the communication to be conducted by any external device connected to the wireless media device 116. The wireless media device 116 is illustrated here as being inserted into an adapter 126, which provides power to the device 116 to allow it to function. The adapter 126 does not provide its own wireless communication capabilities, but simply provides support for the device 116 so that the device 116 can use its own communication capabilities. The adapter 126 includes a battery 128 and a connector 130, and may also include additional features, such as a status indicator 132 which may provide information such as transfer progress. The adapter 126 may conform to any of a number of standards. For example, the adapter 126 may conform to the universal serial bus standard, allowing the device 116 to act in combination with the adapter 126 as a universal serial bus drive, allowing use of the memory capabilities of the device 116. The adapter 126 may receive power from a connection port, such as a universal serial bus port, into which the adapter 126 may be placed, allowing delivery of power to the device 116 without a need to use power from the battery 128. If desired, the adapter may also accommodate additional sources of power, such as an AC power adapter.

Additionally or as an alternative, a wireless media device may include mechanisms to allow for communication with the station 102 over a shorter range. The exemplary device 134 includes a connector 136, storage 138, a processor 140, and a wireless network transceiver 142, and also includes an induction coil 144, allowing it to receive power from an induction coil 145 in the station 102. The device 134 operates under the control of its own communication control module 146, which manages communication using either the transceiver 142 or a high speed short range transceiver 147.

The station 102 includes a receptacle 148 in which a device such as the device 134 may be placed, positioning it at a sufficiently near distance with respect to the induction coil 145 to allow the device 134 to be powered by the coil 145. The device 134 can communicate with the station 102 from any position in range of the access point 114, and by placing the device 134 in the receptacle 148, a user is able to transfer data from the station to the device using power supplied by the station 102. During such operation, the device 134 may communicate using the transceiver 142, or may alternatively communicate using the short range, high speed transceiver 147 to communicate with a compatible transceiver 150 of the station 102.

The station 102 includes a repository 152 of titles residing in the storage 108. A user is able to communicate with the station 102 either directly or remotely. The station 102 includes a display 154, which may suitably be a touch screen display, allowing presentation of a user interface and user selections. The station 102 implements a transaction manager 156, controlling the station 102 so as to present an appropriate user interface and respond to user inputs so as to allow transfer to devices such as the devices 116 and 134. The transaction manager 156 responds to an initiation of contact, such as touching of the display 154 or detection of an approach to the station 102 by a motion sensor 157, by presenting a user interface. The user interface presents an initial selection menu, and the user may navigate through the initial menu and subsequent menus and selections to choose a desired title and indicate delivery preferences. For example, a user may have an account for selection and delivery of titles, and the user's account information may designate a number of different media devices such as the devices 116 and 134 that are owned by the user. Such account information may be stored in a user account database 158. In such a case, the user may designate which device is to receive the title. In addition, the user may invoke an account manager 160 as desired to add devices to the user account, to set preferences for each device, such as the communication protocol to be used with the device and the encryption standard to be used with the device, and to change preferences as desired. Each device may include recognizable identification information, such as an address or an identifier broadcast by the device, so that when a device has been selected, the station 102 may recognize the presence of the device by recognizing the device's address or identifier, and may address communication to the device by including appropriate address or identifier information in transmissions to the device.

The account manager 160 may also be invoked to set preferences related to transactions, such as payment mechanisms, and to manage other preferences relating to transactions, such as which members of a family are authorized to use the account, which categories of titles are preferred, and other preferences.

Once the user has selected a desired title, the transaction manager 156 manages payment details, for example, by receiving and processing details of a user credit or debit card presented using a credit and debit card reader 162. Numerous additional components may be employed, such as a near field communication (NFC) interface 164, allowing communication with devices such as NFC enabled phones, which can be used in short range communication with appropriate devices to provide financial transaction information. Additional components may include a bar code reader 166, allowing the reading of a loyalty card, for example.

The transaction manager 156 then invokes a transfer control module 168 to identify a user device to which the transfer is to be made and to conduct the transfer. Depending on the user specifications and preferences stored in the database 158 or entered during the transaction, the transfer control module transfers the data to an already identified device, or recognizes a new device presented for identification.

In the present example, the user wishes to use the device 116 for the first time, and the device 116 is not identified in association with user account information. The user therefore removes the device 116 from the adapter 126 and temporarily places the device 116 in an interface slot 170 for identification. The transaction manager 156 invokes the transfer control module 168, which reads identifying information from the device 116. The transfer control module 168 constructs a device identity, which includes a label to be used to refer to the device 116 during transactions, and also selects an address to be used for communicating with the device 116. The transfer control module 168 also creates an encryption key to be used for wireless communication with the device 116, and stores the key on the device 116. The device identity for the device may also include digital rights management (DRM) information, with a copy of the DRM information being stored on the device 116 and in association with the device identity for the device 116. The DRM information is used to protect data transferred to a device such as the device 116, so that the data so protected may not be used if copied to a different device. Once a device identity has been created, the transfer control module 168 invokes the account manager 160, which updates user information in the database 158 with the device identity for the device 116.

After the device 116 has been identified and preferences and protocols for the device have been established, it may be removed from the interface slot 170 and wireless communication with the device 116 may be accomplished as desired, with the transfer control module 168 establishing a wireless network communication session with the device 116 and transferring data to the device 116 over the wireless network, with the data being protected with the DRM information for the device if desired. The transfer control module 168 uses the wireless encryption protocol and key associated with the device 116 and transfers the content selected during the user's interaction with the station 102 using the transaction manager 156. If transfer is interrupted, for example, because power is removed from the device 116 or the device 116 moves out of range of the station 102, transfer may be resumed when the device 116 is available again.

In addition to interacting with the station 102 using the display 154, the user may also choose to communicate with the station 102 using a personal data device, for example, by navigating a browser implemented by the personal data device to the address of a uniform resource locator address of a remote communication module 172 of the station 102. The remote communication module 172 mediates communication between the transaction manager 156 and the user's personal data device 174, allowing the user to make selections at a distance from the station 102. Once the transaction has been concluded, the transaction manager 156 invokes the transfer control module 168, which initiates the transfer. If desired, a user can conduct a transaction from a distance and then the transfer control module 168 can conduct the transfer when the user's device, such as the device 116, is detected in range of the access point 114. Such a procedure is useful, for example, if a station such as the station 102 is at an airport or other area at which a user intends to arrive in the future. A user planning to fly from an airport at which a station such as the station 102 is deployed might conduct a transaction before leaving home. When the user arrived at the airport, the transfer control module 168 would detect the presence of the device 116 and transfer the selected title to the device 116. The transfer would be conducted transparently to the user, without a need for the user to interact with the station 102 while at the airport.

As noted above, in addition to providing for relatively long range wireless communication, the station 102 may be configured to provide power to a suitable wireless device over a short range, and to transfer data at a higher speed over a short range. To this end, the transfer control module 168 may also recognize a device such as the device 134 placed in the receptacle 148 and transfer data to the device 134 using the transceiver 150. The transceiver 150 and the transceiver 146 may suitably employ 60 gigahertz (GHz), 3 to 15 gigabits per second data transfer, or other suitable high speed wireless mechanisms.

Once the transfer has concluded, the user may take the removable media device receiving the transfer and use it in the same way as he or she would use any media device conforming to the same standard, for example, placing it in an interface slot of a player or a computer.

Figure 2:
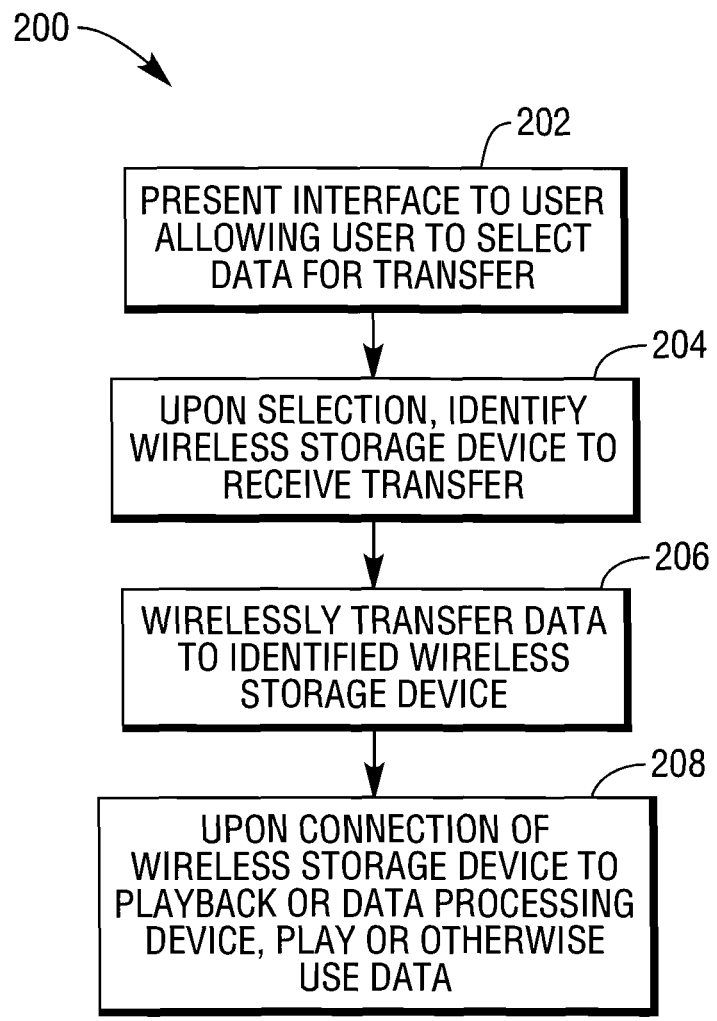
FIG. 2 illustrates a process of wireless data transfer according to an aspect of the present invention.

FIG. 2 illustrates the steps of a process 200 according to an aspect of the present invention. The process 200 may suitably be carried out using a system such as the system 100 of FIG. 1. At step 202, in response to a user initiation of contact with a data transfer station, an interface is presented to the user allowing a user to conduct a transaction involving user selection of content desired for transfer. User initiation may be accomplished, for example, through user interaction with the station or remotely through contact with the station over a user device such as a personal computer or wireless communication device. At step 204, upon user selection of the desired content, a wireless storage device to which the content is to be transferred is identified, either through selection of a known device associated with the user or submission of a new device for identification. The device may be, for example, a portable hard disc drive or a removable media device, adapted to support wireless communication with a compatible data transfer station and providing a standard connection interface to a playback or data processing device. The wireless storage device may include a transceiver and may store communication and control software allowing the device to serve as a wireless data transfer point and managing wireless communication between the device and the station.

At step 206, data is wirelessly transferred to the wireless storage device. Depending on the nature and placement of the wireless storage device, the data transfer may be accomplished over a relatively long range communication link, such as over a wireless network or over a high speed short range communication link with a wireless storage device placed near a wireless transfer component of the transfer station. The data may be protected with an encryption key associated with the wireless storage device, as well as with digital rights management information associated with the device. At step 208, upon conclusion of the transfer and connection of the wireless storage device to a suitable playback or data processing device, the transferred data is played or used as desired.

While the present invention is disclosed in the context of a presently preferred embodiment, it will be recognized that a wide variety of implementations may be employed by persons of ordinary skill in the art consistent with the above discussion and the claims which follow below.

We claim:

1. A wireless storage device, comprising:
   storage adapted and configured for storing data transferred to the wireless storage device;
   an interface connector adapted and configured for providing access to data stored on the wireless storage device and present a standardized interface compatible with a mating interface connector of an external device to which the wireless storage device is connected;
   a second storage adapted and configured for storing a wireless storage device identifier to be read by a data transfer station to construct a storage device identity associated with user account information including a label to refer to the storage device by the data transfer station during transactions including wireless transfer of entertainment content from the data transfer station to the wireless storage device at a distance from the data transfer station;

a wireless transceiver adapted and configured for providing wireless communication of data between the wireless storage device, the data including the wireless storage device identifier, and the data transfer station configured for transferring content to the wireless storage device in response to communications from a user associated with the wireless storage device;

a processor adapted and configured for managing communication between the wireless storage device and the data transfer station, the processor being configured for responding respond to commands and queries from the data transfer station and to identify data directed to the wireless storage device and store the data to the storage; and an adapter configured for interfacing with the wireless storage device by the wireless storage device inserting into the adapter, and the adapter having a status indicator providing a transfer progress of the data being received by the wireless storage device, wherein the adapter does not have wireless communication capabilities but provides support for the wireless storage device to use wireless communication capabilities of the wireless storage device and wherein the adaptor providing power to the wireless storage device;

wherein the wireless storage device is further configured for communicating with the data transfer station without requiring that communication to be conducted through any external device to which the wireless storage device is connected to.

2. The wireless storage device of claim 1, wherein the processor is adapted to and configured for controlling the wireless transceiver to receive data using a wireless network protocol.

3. The wireless storage device of claim 2, further comprising an induction coil adapted and configured for allowing the wireless storage device to receive power from a mating induction coil of the data transfer station.

4. The wireless storage device of claim 1 further comprising a high speed short range wireless transceiver, and wherein the processor is further adapted and configured for controlling the short range wireless transceiver to wirelessly receive data using a short range high speed data transfer protocol when the wireless storage device is inserted in the data transfer station proximate a high speed short range wireless transceiver of the data transfer station.

5. The wireless storage device of claim 4, wherein the short range wireless transceiver of the wireless storage device is further adapted to and configured for receiving data at a rate of from 3 gigabits to 15 gigabits per second.

6. The wireless storage device of claim 1, wherein the second storage is further adapted and configured for storing encryption key information and wherein the processor is configured for using the encryption key to decrypt data received from the data transfer station.

7. A data transfer station configured for transferring data to a wireless storage device, comprising:

a wireless network transceiver adapted and configured for communicating communicate data between the station and a first wireless storage device, the communication achieved without requiring action by any external device to which the first wireless storage device is connected to, and wherein the first wireless storage device configured for insertion into an adapter having a status indicator providing a transfer progress of the data being received by and sent to the wireless storage device, wherein the adapter does not have wireless communication capabilities but provides support for the wireless storage device to use wireless communication capabilities of the wireless storage device and wherein the adapter provided power to the wireless storage device;

storage adapted to and configured for storing data to be transferred to the wireless storage device; and a processor adapted to and configured for managing transfer of data to the wireless storage device, the processor adapted to and configured for receiving inputs from a user selecting data to be transferred and to identify the wireless storage device to construct a storage device identity associated with stored user account information including a label to refer to the wireless storage device to which the data is to be transferred, during transactions including transfer of entertainment content by the wireless transceiver to the identified wireless storage device at a distance from the data transfer station, wherein the processor configured for employing the stored user account information for the wireless storage device to conduct transactions and to encrypt data comprising entertainment content for transmission to the wireless storage device based on a stored encryption key included in the stored user account information associated with the identified wireless storage device.

8. The data transfer station of claim 7, wherein the processor is adapted to and configured for identifying plural wireless storage devices based on stored user account information for plural users and to protect data to be transmitted to a particular wireless storage device based on digital rights management information included in the stored user account information associated with the identified wireless storage device.

9. The data transfer station of claim 7, wherein the processor is configured for controlling the wireless transceiver to transfer data to the wireless removable storage device using wireless network protocols.

10. The data transfer station of claim 7, wherein the processor is configured for controlling the wireless transceiver to transfer data to the wireless storage device using short range high speed wireless communication protocols to transmit data at a rate of from 3 gigabits to 15 gigabits per second.

11. The data transfer station of claim 7, further comprising a remote communication interface and wherein the processor configured for receiving and responding to user inputs and selections made using a user communication device communicating with the data transfer station over the remote communication interface.

12. The data transfer station of claim 7 wherein the wireless storage device is adapted to and configured for conforming to standards for removable memory cards.

13. The data transfer station of claim 7 further comprising:

a short range high speed transceiver adapted to and configured for wirelessly transmitting data at a rate of from 3 gigabits to 15 gigabits per second;

a receptacle adapted to and configured for positioning a removable wireless storage device within range of the short range high speed transceiver; and, wherein upon recognizing the removable wireless storage device is placed within the receptacle, the short range high speed transceiver is employed to wirelessly transmit data.

14. The data transfer station of claim 7 further comprising:
a touchscreen display adapted to and configured for displaying user interface and user selections.

15. The data transfer station of claim 14 wherein the touchscreen display is further adapted to and configured for displaying user account information identifying a number of different media devices owned by the user, and upon selection of a particular media device by the user to retrieve an associated identifier.

16. A method of data transfer, comprising the steps of:
receiving by a data transfer station a user selection identifying data for entertainment media to be transferred to a wireless storage device;
identifying by the data transfer station a wireless storage device at a distance from the data transfer station to which data is to be wirelessly transferred from a wireless storage device identifier wirelessly broadcasted by the wireless storage device, the wireless storage device identifier associated with stored user account information including a label to refer to the wireless storage device to which data is to be transferred during transactions including the wireless transfer of entertainment media: and
controlling by the data transfer station a wireless data transceiver to wirelessly transfer the identified data to the identified removable media device, and when the wireless storage device moves out of range suspending the transfer and resuming the transfer when the wireless storage device is again detected within range, and wherein the wireless storage device inserted into an integrated adapter, and the adapter having status indicator providing a transfer progress of the data being received by the wireless storage device, wherein the adapter does not have wireless communication capabilities but provides support for the wireless storage device to use wireless communication capabilities of the wireless storage device and wherein supplying power by the adapter to the wireless storage device.

17. The method of claim 16, further comprising:
utilizing the stored user information associated with the wireless storage device to conduct a transaction with the user.

18. The method of claim 16, wherein the step of identifying the wireless storage device is followed by a step of retrieving encryption data associated with the device and encrypting data to be transferred to the device using an encryption key included in the encryption data.

19. The method of claim 16, wherein the step of identifying the wireless storage device is followed by a step of retrieving digital rights management information associated with the device and protecting data to be transferred to the wireless storage device using the digital rights management information.

* * * * *